United States Patent [19]

Iwahara et al.

[11] Patent Number: 4,895,429
[45] Date of Patent: Jan. 23, 1990

[54] REAR PROJECTION APPARATUS

[75] Inventors: Yoshiaki Iwahara, Yokosuka; Masanori Oguino; Yuzo Tamura, both of Yokohama, all of Japan

[73] Assignee: Hitachi, Ltd., Tokyo, Japan

[21] Appl. No.: 250,114

[22] Filed: Sep. 28, 1988

[30] Foreign Application Priority Data

Sep. 30, 1987 [JP]    Japan ................... 62-243709

[51] Int. Cl.$^4$ ............................................. G03B 21/56
[52] U.S. Cl. .................................................... 350/124
[58] Field of Search ............... 350/117, 123, 124, 125, 350/129; 353/30, 94

[56] References Cited

U.S. PATENT DOCUMENTS 2,030,505  2/1936  DeRoulet ........................... 350/124
4,473,355  9/1984  Pongratz ........................ 350/125 X
4,668,046  5/1987  Yatabe et al. ..................... 350/117

FOREIGN PATENT DOCUMENTS 62-6733  1/1987  Japan .

*Primary Examiner*—Richard A. Wintercorn
*Attorney, Agent, or Firm*—Antonelli, Terry & Wands

[57] ABSTRACT

A rear projection apparatus is disclosed which is provided with at least two optical projection lens units. Two or more projected images are joined to form a single projected image on a screen. A light reflection preventing member is provided on a blocking plate for preventing the adjacent images from overlapping with each other. The reflection preventing member is used for preventing the light, projected onto the blocking plate, from being introduced into the screen, thereby preventing a degradation of contrast.

6 Claims, 9 Drawing Sheets

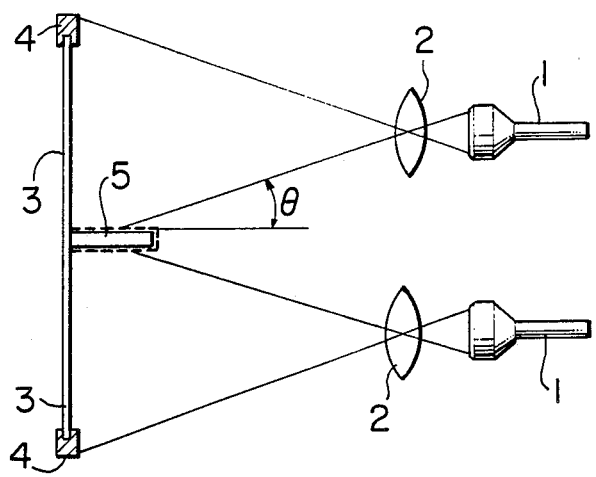
FIG. 1
FIG. 2A
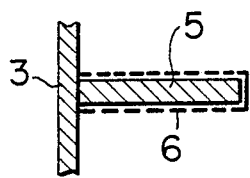
FIG. 2B
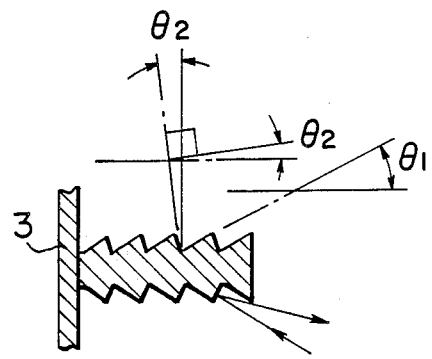
FIG. 3A
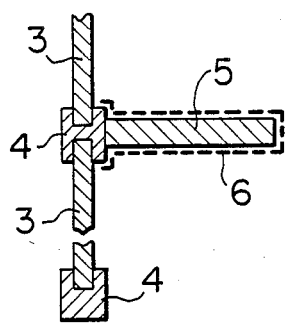
FIG. 3B
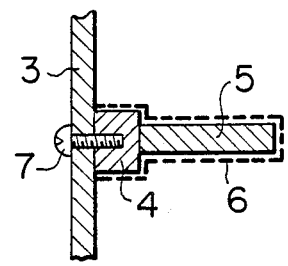

REAR PROJECTION APPARATUS

BACKGROUND OF THE INVENTION

1. Field of the Invention

The present invention relates to a rear projection apparatus which is provided with at least two optical projection means and means for preventing defects due to a blocking plate provided between screen components for preventing the overlap of the adjacent projected images along joint portion between the rear projection type screen components.

2. Description of the Prior Art

As shown in Japanese Utility Model Unexamined Publication No. 62-6733, a means for preventing a reflection of the projected light has not been provided on a blocking plate between the adjacent projected images.

For this reason, if a distance between the adjacent images is short, the projected light is reflected by the blocking plate to be introduced into the screen, so that a peripheral portion of the blocking plate is brightened to degrade the contrast.

According to the blocking plate disclosed in Japanese Utility Model Unexamined Publication No. 62-6733, a ray of light projected so that a pupil of a lens is brightened due to scattering light is overlapped with the directly projected light. As a result, a black level on the screen is remarkably floated up so that the contrast or the image quality is degraded.

This will be explained with reference to FIGS. 11 and 12 showing general projection means. In such projection means, a ray of overlapping light, such as scattering light of the image, projected on a blocking plate 5 projected at a joint portion between the images is reflected at a surface of the blocking plate 5, so that the reflection light 8 causes shades 9 with a width W on both sides of the joint portion as shown in front view in FIG. 12, thus making the black level on the screen float up to considerably reduce the contrast or the image quality. Also, in order to avoid the shade, it is necessary to provide a wide (thick) frame to cover the width W.

Also, if the frame is provided to the screen, the projected light is blocked by the frame. Thus, it is impossible to project the image on a portion, corresponding to the blocking plate, of the screen.

SUMMARY OF THE INVENTION

An object of the present invention is to provide a rear projection apparatus in which the shade on a screen is prevented and the partition between the adjacent images is not attractive.

According to the present invention, a reflection preventing means is provided on a surface of the blocking plate so as not to project the adjacent images on the screen.

In order to more effectively achieve the above-described object, blocking plates may be provided directly at the adjacent image portions on the united screen which is generally constructed by a number of screen units continuously joined with each other.

According to the provision of such reflection preventing means provided on the surfaces of the blocking plates, it is possible to suppress the degradation in contrast and to thin the partitions between the adjacent images.

According to the invention, the blocking plate may be provided directly to the adjacent image portion on the integral screen, so that a reflecting light and shades are prevented. Thus, the partition between the projected images may be made narrow (thinned).

According to the present invention, there is provided a practical and high performance multi-face rear projection apparatus in which the reflection light is prevented from being introduced into the screen to avoid the shade, and it is possible to thin the joint portion. Also, in the case where the thin frame is mounted on the blocking plate, the frame is made of transparent material so that a blocking of the image may be prevented.

The other objects, features and advantages of the invention will become more apparent by the following description and accompanying drawings and the appended claims.

BRIEF DESCRIPTION OF THE DRAWINGS

FIG. 1 is a plan view showing a principle of a rear projection apparatus according to the invention;

FIG. 2A is a partially enlarged view showing a blocking plate provided with a reflection preventing member in FIG. 1;

FIG. 2B is a partially enlarged view showing a blocking plate whose surface is sawtoothed;

FIGS. 3A and 3B, 4A to 4G and 5A to 5D are partially enlarged views showing a mounting method of a blocking plate shown in FIG. 1;

FIG. 3A shows an example in which a screen frame is used commonly;

FIG. 3B shows an example in which screen frame is fixed by a screw;

FIG. 4A shows an example in which the blocking plate is mounted on a mounting angle;

FIG. 4B shows an example in which the blocking plate is partially adhered to the screen;

FIG. 4C shows a rear view of the example shown in FIG. 4B;

FIG. 4D shows an example in which the blocking plate is adhered to the screen;

FIGS. 4E and 4F show examples in which the blocking plates are partially fixed to two screen components;

FIG. 4G shows a rear view of the screen shown in FIG. 4F;

FIG. 5A shows an example in which a frame mounted on the blocking plate between the screen components is made of transparent material;

FIGS. 5B to 5D show other examples of the transparent frames;

DESCRIPTION OF THE PREFERRED EMBODIMENTS

Figure 4A:
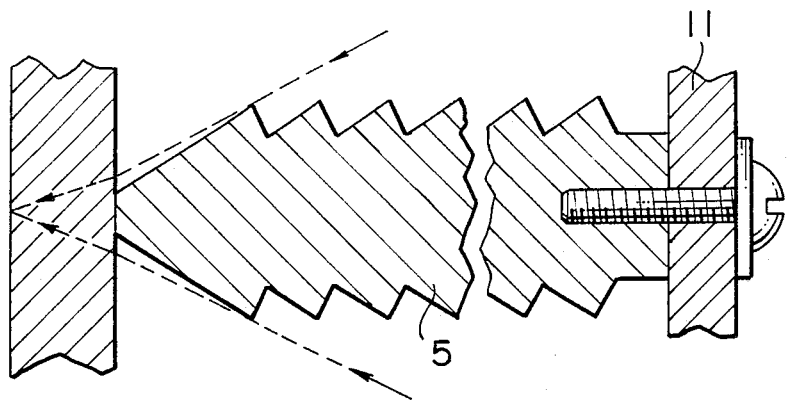

An embodiment of the invention will now be described with reference to FIGS. 1 to 5. In FIG. 1, there is shown a rear projection apparatus in which at least two optical projecting means for enlarging and projecting images of a CRT 1 through lenses 2 are arranged adjacently. A sufficiently large blocking plate 5 is provided in order to avoid the overlap of scattering light produced in peripheries of projected images adjacent to a joint portion of screens 3 of the rear projection apparatus. In addition, reflection preventing member 6 such as a black mat is provided around the surface of the blocking plate 5 in order to prevent the scattering light from reflecting on the blocking plate 5 as shown on enlargement scale in FIG. 2A. It is effective to use a black paint, a black tape, a black leather, a whisker material or the like as the reflection preventing member 6. It is also effective to provide a corrugation on the surface of the blocking plate or to apply a black almite coating thereto in such manner that a refused reflection is caused by the surface of the blocking plate 5.

Also, FIG. 2B shows another example of the blocking plate 5. A surface of the blocking plate 5 is sawtoothed. Assuming that the ray angle of incident light to a projected light be $\theta$ (shown in FIG. 1), an angle $\theta_1$ is larger than the angle $\theta$, and an angle $\theta_2$ is selected to an angle equal to or smaller than an angle, $(90° + \theta)/2$.

This results that the ray having an incident angle $\theta$ can not reflect to the screen surface. Further, in an usual display of projection type, a value of the angle $\theta$ is maintained within the range of about 15° to 30°.

In FIGS. 1 and 2, the blocking plate 5 is attached with adhesive between the projected images on a continuous screen. However, FIG. 3A shows a structure in which a screen frame 4 is commonly used for the adjacent screens 3 and the blocking plate 5 is provided on the screen frame 4 so that a partition portion between the adjacent screens is made narrow (thin) so as not to attract attention. Also, FIG. 3B shows an example in which a blocking plate 5 or a frame attached to the blocking plate 5 is mounted on a screen 3 by means of a screw 7. This example is superior in mechanical strength in addition to the feature in which the attention is not attracted to that portion. It is possible to use the sawtoothed blocking plate shown in FIG. 2B instead of the planar plate shown in FIGS. 3A and 3B.

FIGS. 4A to 4G show the mounting method of the blocking plates shown in FIGS. 2A and 2B other than the embodiment shown in FIGS. 3A and 3B.

Figure 4B:
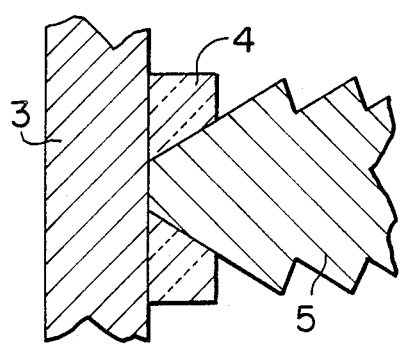
Figure 4C:
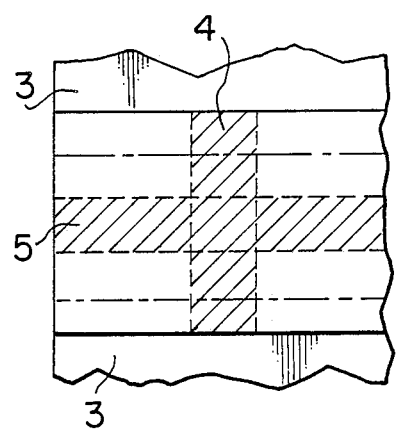
Figure 4D:
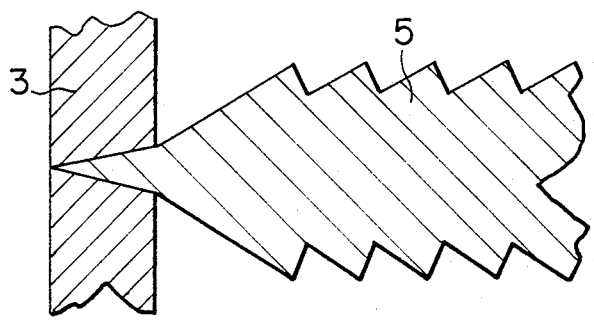
Figure 4E:
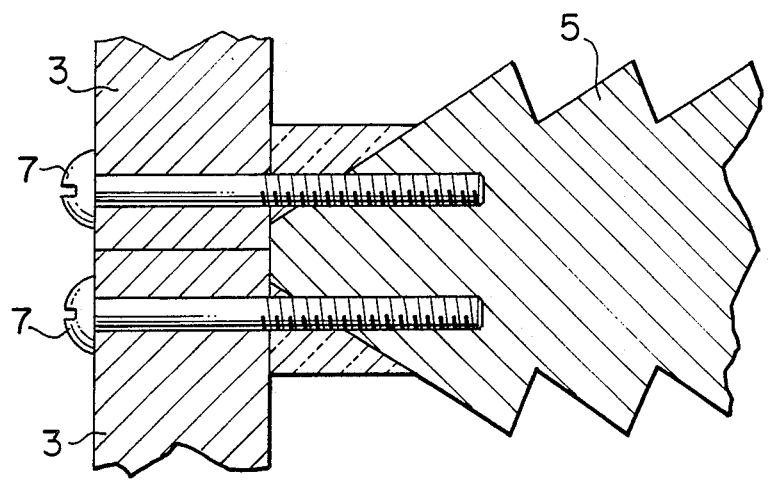
Figure 4F:
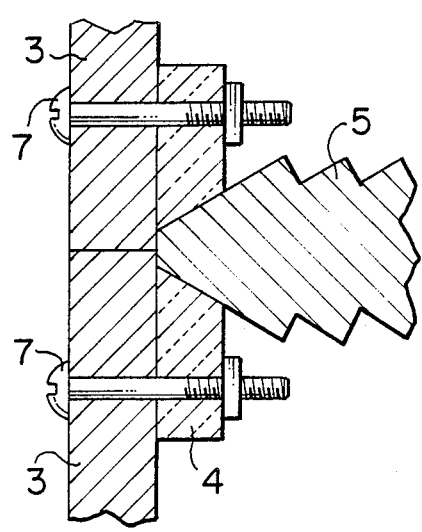
Figure 4G:
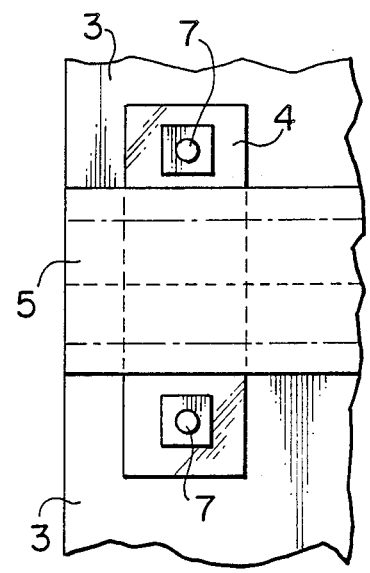

FIG. 4A shows an example in which a blocking plate 5 is fixed to a mounting angle 11 by means of a screw or the like and a screen 3 is mounted on the blocking plate 5. In case of a large screen, the structure is inferior in mechanical strength since a thickness of the screen is small. For this reason, if the blocking plate 5 is fixed to the angle 11 between the adjacent screens, the mechanical strength is enhanced. Also, since the screens may be held in a stable manner, it is possible to eliminate a change in image quality to enhance its performance. FIGS. 4B and 4C show an example in which the screen 3 and the blocking plate 5 are fixed to each other by using a partial frame (adhesion member) 4 with adhesive. FIG. 4D shows an example in which the blocking plate 5 is adhered to the screen. FIGS. 4E and 4F show examples in which two screens 3 are partially fixed by screws or the like. FIG. 4G shows a rear view of the structure shown in FIG. 4F.

In the embodiments shown in FIGS. 4A to 4G, the blocking plate 5 is partially fixed by means of adhesives or screws, so that the ray of the projecting light passing through the side edge of the blocking plate 5 may be introduced onto the screen surface without a substantial blocking due to the adhesives or the screws, as best shown in FIG. 4A.

The same mounting method illustrated in FIGS. 4A to 4B may be applied to the structures shown in FIGS. 3A and 3B.

Figure 5A:
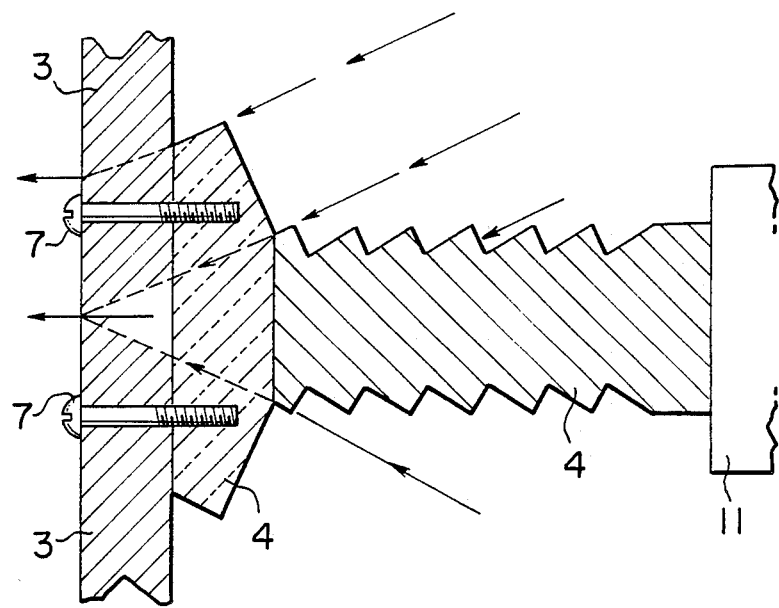

FIG. 5A shows an example in which the frame mounted on the blocking plate between the screens is transparent. Since the ray of light passes through the frame, there is no blocking due to the frame. Thus, the joint portion of the screens is not attractive.

Figure 5B:
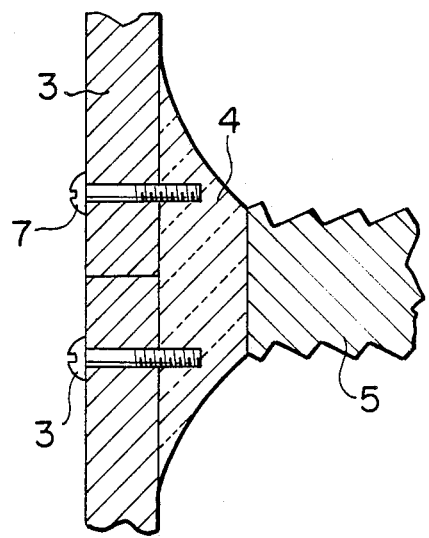

FIG. 5B shows another example of the transparent frame 4. In FIG. 5B, the transparent frame is defined by a monotonously continuous surface so as to further suppress the blocking of the light.

Figure 5C:
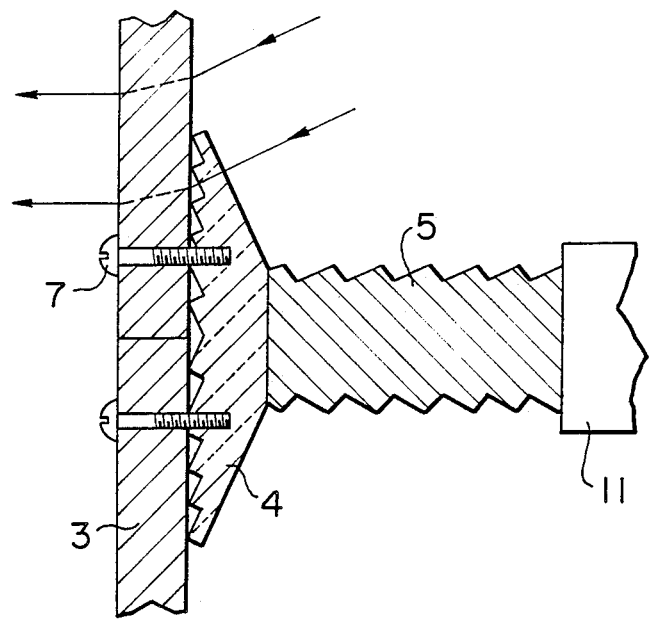

FIG. 5C shows an example in which the incident surface and emergent surface of the transparent frame 4 are held substantially normally to the projecting light ray. According to the invention, the projecting light ray that has directly entered into the screen 3 and the projecting light ray that has entered into the transparent frame 4 are advanced in the same direction within the screen 3 so that the emergent lights from the screen are directed to the same direction.

As a result, since the difference in direction between the ray that has passed through the transparent frame 4 and the ray that has been directly introduced into the screen 3 may be reduced, the non-uniformity of the image quality may be suppressed.

Figure 5D:
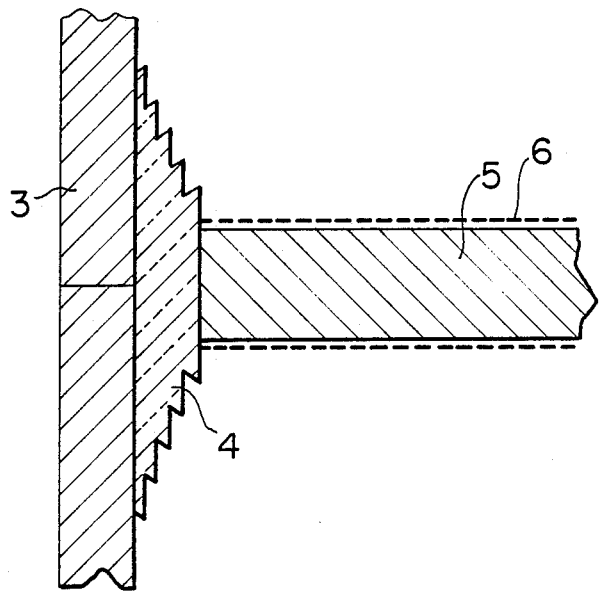

FIG. 5D shows another example of the transparent frame 4, in which an incident surface and an emergent surface of the transparent frame 4 is in parallel with the incident surface of the screen. In this example, it is possible to adhere the emergent surface of the transparent frame 4 directly onto the incident surface of the screen 3. Therefore, the screws shown in FIG. 5C may be dispensed with. According to this example, it is possible to suppress the non-uniformity of the image quality.

In the foregoing description, for the sake of simplification of the explanation, the screen 3 has been shown as a one-piece member.

Figure 6:
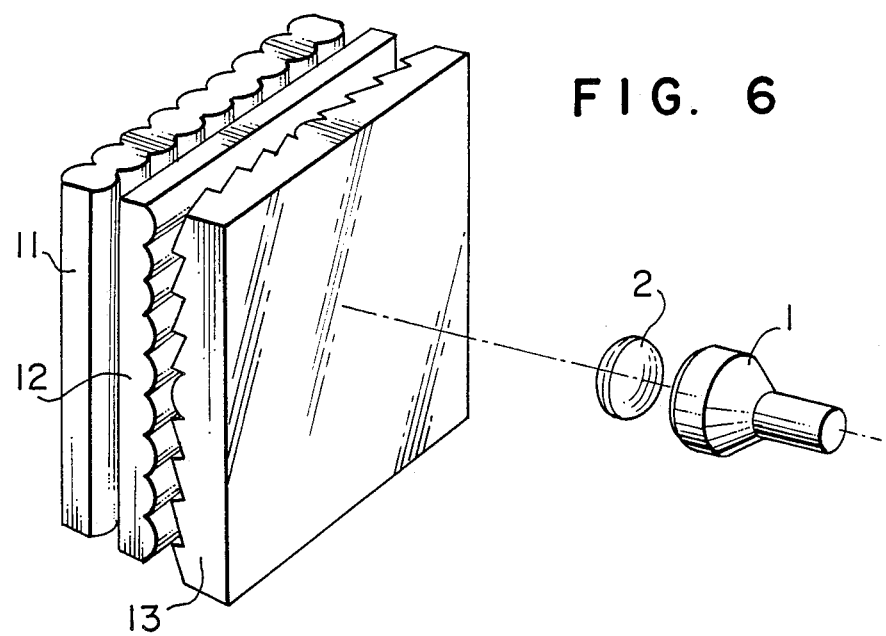
FIG. 6 is a perspective view showing structural elements of the screen.

In general, the screen 3 is composed of a plurality of elements. FIG. 6 shows an example of the structural elements of the screen 3.

In FIG. 6, reference numeral 1 denotes a CRT; reference numeral 2 denotes a projection lens; reference numeral 11 denotes a horizontal lenticular sheet for diffusing the light in a micro manner in the horizontal direction; reference numeral 12 denotes a vertical lenticular sheet for diffusing light in a micro manner in the vertical direction; and reference numeral 13 denotes a Fresnel lens sheet for converting the incident light, diffused in a macro manner from the projection lens 2, into a parallel emergent light, with a Fresnel lens surface being formed on its emergent surface. The detail of the screen is described in U.S. Pat. No. 4,536,056. For some cases, it is possible to dispense with the vertical lenticular sheet 12.

In FIG. 1, there are only shown the two optical projecting means. However, the invention is applicable of course to 150 units (10 ×15) each of which is composed of a unit screen of 40 inch, for example.

Explanation will be made as to the case of the 10×15 arrangement.

The embodiments shown in FIGS. 2 to 5 should be applied to each boundary portion between 150 Fresnel sheets.

Figure 7:
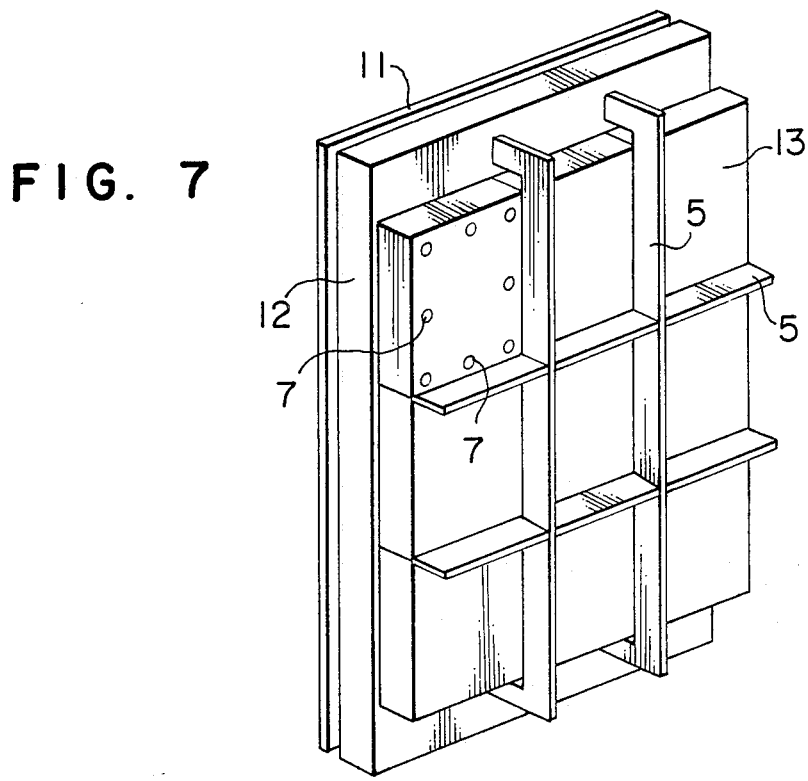
FIG. 7 is a perspective view showing the 3×3 screen arrangement whose screen unit is shown in FIG. 6.

An embodiment of the invention in which the foregoing elemental techniques are gathered is shown in FIG. 7. In this case, the horizontal lenticular sheets 11 are generally produced through a continuous extrusion rolling method. Thus, it is possible to produce a series of 15 rows of lenticular sheets in the longitudinal direction. Further, the 15 rows of sheets are adhered to each other in the lateral direction to form a large single piece of sheet as a whole. Also, since the vertical lenticular sheets 12 are produced through a continuous extrusion rolling method in general, it is possible to form a sheet of 10 rows in the lateral direction or a sheet of 15 rows in the longitudinal direction. In the same manner, these sheets are adhered to each other to obtain a large piece of sheet. However, since the Fresnel sheets 13 are not defined by a one-dimensional linear shape but a concentric shape, it is difficult to form the Fresnel sheets through the extrusion molding method. Thus, it is general to produce them by a compression molding method. Therefore, it is necessary to use 150 Fresnel sheet units.

The lenticular sheets 11 and 12 are in the form of the large single sheet of the 10×15 arrangement and may be suspended in a curtain manner. However, it is very difficult to mutually adhere the 150 Fresnel sheets in the form of a single sheet.

Figure 8:
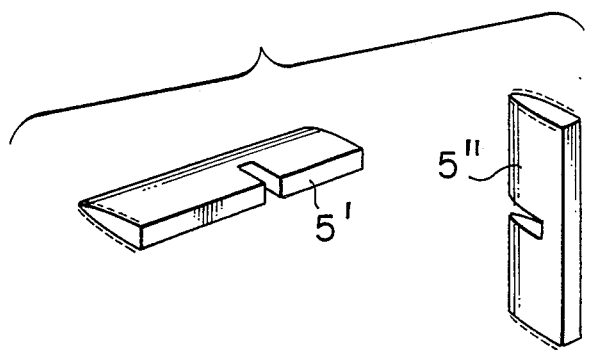
FIG. 8 a perspective view showing a positional relation at an intersection of longitudinal and lateral blocking plates.

In FIG. 7, reference numeral 11 denotes a single horizontal lenticular sheet having a thickness of about 1 mm. Reference numeral 12 denotes a single vertical lenticular sheet having a thickness of about 3 mm. Reference numeral 13 denotes nine Fresnel sheets each having a thickness of about 1 to 3 mm. Reference numeral 7 denotes nine screws for a single Fresnel sheet 13. Each Fresnel sheet is attached to the vertical lenticular sheet 12 by the screws 7. Reference numeral 5 denotes blocking plates which have been explained in FIG. 2A or 2B. The horizontal and vertical blocking plates are designated by reference characters 5' and 5" in FIG. 8, respectively.

As schematically shown in FIG. 7, it is effective to fix the upper and lower end portions of the blocking plates 5 to the vertical lenticular sheet 12 through a method such as adhesion or screw-fastening for the purpose of preventing the falling thereof. The whole screen is used by suspending the upper ends of the lenticular sheets 11 and 12 by means of discrete support members in a curtain manner. For the purpose of preventing the generation of undesired reflected light, the four peripheral edge surfaces of each Fresnel sheet 13 is subjected to a black coating or tape.

The structure shown in FIG. 7 is based upon the fact that the vertical lenticular sheet 12 for diffusing the light in the micro manner in the vertical direction is used as a structural element. However, for a particular case, the vertical lenticular sheet 12 may be dispensed with. In such a screen, it is sufficient to screw-fasten the Fresnel sheets 13 directly onto the front sheet 11. The other structure may be used in the same manner.

A modification of the structure of FIG. 7 will be explained. In the case where the huge screen is installed in a large hall, it is often difficult to transport the huge screen of 3 m×5 m or more through a door or a window. In this case, the lenticular sheets 11 and 12 are not adhered in the lateral direction while using the sheets that are long in the longitudinal direction to overcome the transportation problem. Namely, in the case where the size of the unit screen is of 40 inch dimension, the width of the longitudinal sheet is at about 80 cm. Thus, it is easy to pass the sheets through a door.

Figure 9:
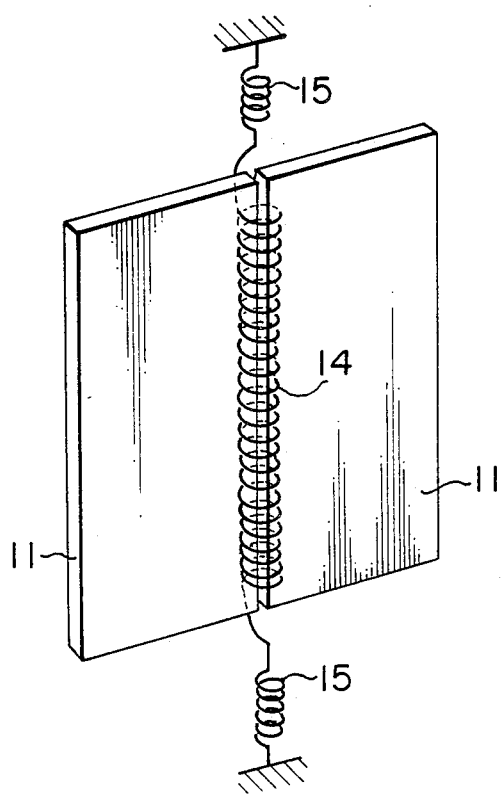
FIG. 9 is a perspective view showing a joint portion of a front sheet of the screen.

As shown in FIG. 9, a discontinuous portion of the lateral edge portions of the longitudinal sheets are sewed with silk thread or metal wire that is black, whereby it is possible to suppress the apparent discontinuity. In FIG. 9, reference numeral 11 denotes a longitudinal horizontal lenticular sheet; reference numeral 14 denotes a black thread; and reference numeral 15 denotes a spring that is provided for the purpose of absorbing the looseness of the black thread. Although not shown in FIG. 9 for the simplification, it is effective to insert a black tape having whisker, along the adjacent end faces of the longitudinal sheets for the purpose of interrupting the light through the gap.

The black thread has a diameter of about 0.3 mm and a sewing pitch is set at about 6 mm or more, whereby the effective blocking extent by the black thread may be less than about 10%. Therefore, it is possible to suppress the visual degradation.

Figure 10:
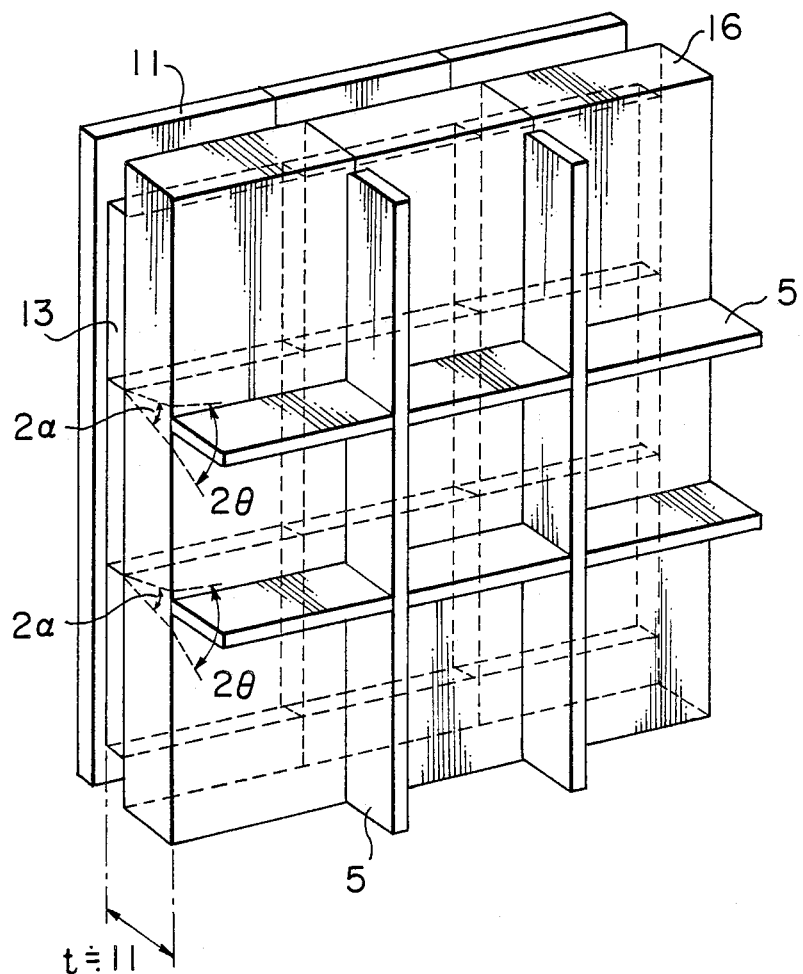
FIG. 10 is a perspective view showing another embodiment of the screen shown in FIG. 7.
Figure 11:
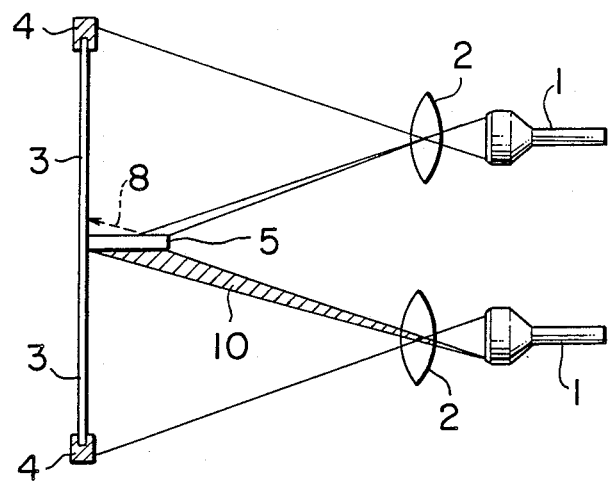
FIG. 11 is a plan view showing the shade on the screen, of the projected light generated by the conventional blocking plate.
Figure 12:
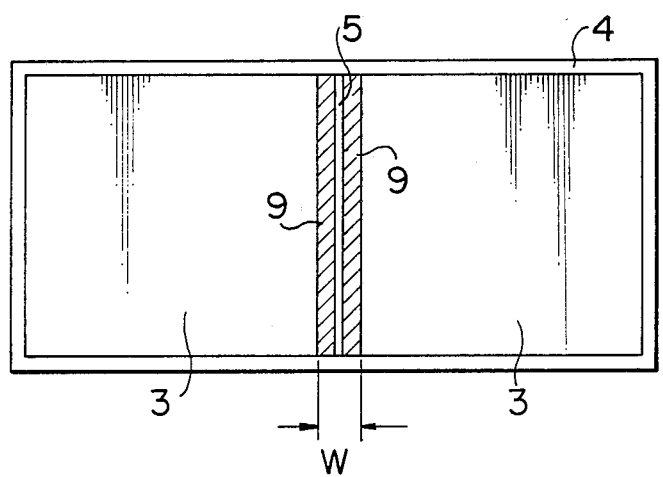
FIG. 12 is a frontal view of the screen shown in FIG. 11.

FIG. 10 shows still another modification of the invention. FIG. 10 shows an example in which reinforcing plates are added to the foregoing example, thus suppressing the adverse affect of the shade of the blocking plates. In FIG. 10, reference numeral 16 denotes the longitudinal reinforcing plates. The reinforcing plates 16 are each made of transparent acrylic resin and are about 8 mm thick. The reinforcing plates are arranged in three rows. Reference numeral 11 denotes lenticular sheets as mentioned above. The lenticular sheets are about 3 mm thick respectively, composed of the sheets longer in the longitudinal direction than in the vertical direction and arranged in three rows. Reference numeral 13 denotes nine Fresnel sheets. In the same manner as described before, the respective Fresnel sheets are attached to the reinforcing plates 16 by means of screws or threads. Reference numeral 5 denotes the blocking plates having a thickness of about 4 mm.

The principle in which the shade of the blocking paltes may be reduced by the addition of the reinforcing plates 16 will be explained by using an angle $\alpha$ shown in FIG. 10.

The angle $\alpha$ is determined on the basis of Law of Snell in accordance with a diffusing angle $\theta$ of light shown in FIG. 10:

$$n \sin \alpha + \sin \theta$$

where n is the refractive index of the acrylic resin and is about 1.5 and $\theta$ is at about 15 degrees in general.

From the equation, the value of $\alpha$ is about 10 degrees. Accordingly, on the incident side of the reinforcing plates, the width h of the unnecessary light region is given as follows:

$$h = 2t \tan \alpha = 2 \times 11 \text{ mm} \times \tan 10° \simeq 3.9 \text{ mm}$$

where t is at 11 mm that is a sum of the thickness of reinforcing plate (8 mm) and the thickness of the Fresnel sheets (3 mm). Accordingly, the width h is substantially the same as the thickness of the blocking plates (4 mm). Thus, there is no apparent shade of the blocking plates. It is possible to project a high quality image with suppressed defects of light at the joint portions.

As described above, according to the present invention, the reflected light is not generated on the blocking plates and is not projected onto the screen. In addition, it is possible to make an area of joint portions narrow (thin). Also, in the case where a narrow frame is applied to the blocking plate, the frame is made transparent to reduce the blocking of the image, which is practical and is capable of providing a high performance multi-face rear projection apparatus.

What is claimed is:

1. A rear projection apparatus having means for joining and projecting at least two images as a single image on a screen, and at least two optical projection means, said rear projection apparatus comprising means for preventing reflection, said reflection preventing means being provided on a surface of a blocking plate for preventing an overlap of the adjacent images on said screen, and said reflection preventing means eliminating a projection of reflected light derived from a ray of light projected on said blocking plate, thus preventing a degradation in contrast.

2. The rear projection apparatus according to claim 1, wherein said reflection preventing means includes sawteeth formed on a surface of said blocking plate, wherein surfaces of said sawteeth are formed at an angle such that the light reflected by said surfaces of said sawteeth is not introduced into the surface of said screen.

3. The rear projection apparatus according to claim 2, wherein said blocking plate is fixed to an angle mounted between screen components and is used for reinforcing the screen.

4. The rear projection apparatus according to claim 1, wherein said blocking plate is provided on a frame commonly provided between adjacent screen components, whereby a distance between the adjacent images are made narrow as much as possible.

5. The rear projection apparatus according to claim 4, wherein a frame part of the blocking plate provided on said frame is made of transparent material, whereby the light is not blocked by the frame part but is passed through said frame part so that a invisible part of the image between the adjacent screen components is reduced.

6. The rear projection apparatus according to any one of claims 1 to 5, wherein said blocking plate is provided between the screen components or on a continuous screen member between the images.

* * * * *